US009053321B2

(12) United States Patent
Duncan et al.

(10) Patent No.: US 9,053,321 B2
(45) Date of Patent: Jun. 9, 2015

(54) ANTIVIRUS SYSTEM AND METHOD FOR REMOVABLE MEDIA DEVICES

(71) Applicant: Imation Corp., Oakdale, MN (US)

(72) Inventors: David Paul Duncan, Louisville, CO (US); David Blake Farmer, Louisville, CO (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 14/152,317

(22) Filed: Jan. 10, 2014

(65) Prior Publication Data

US 2014/0130168 A1    May 8, 2014

Related U.S. Application Data

(62) Division of application No. 13/269,463, filed on Oct. 7, 2011, now Pat. No. 8,635,698.

(51) Int. Cl.
*G06F 11/00* (2006.01)
*G06F 21/56* (2013.01)

(52) U.S. Cl.
CPC .............. *G06F 21/56* (2013.01); *G06F 21/567* (2013.01)

(58) Field of Classification Search
CPC ................................ G06F 21/56; G06F 21/567
USPC ................................... 726/4, 22, 24; 713/188
See application file for complete search history.

(56) References Cited

U.S. PATENT DOCUMENTS

| 5,802,277 | A | * | 9/1998 | Cowland | 726/22 |
|---|---|---|---|---|---|
| 7,853,999 | B2 | * | 12/2010 | Khilnani et al. | 726/14 |
| 7,975,304 | B2 | * | 7/2011 | Lu | 726/24 |
| 2006/0026283 | A1 | * | 2/2006 | Trueba | 709/225 |
| 2007/0094654 | A1 | | 4/2007 | Costea | |
| 2008/0276302 | A1 | * | 11/2008 | Touboul | 726/3 |
| 2008/0282351 | A1 | | 11/2008 | Khilnani et al. | |
| 2009/0113128 | A1 | * | 4/2009 | Zhao | 711/115 |
| 2010/0009633 | A1 | | 1/2010 | Goldman et al. | |
| 2010/0154062 | A1 | * | 6/2010 | Baram et al. | 726/24 |
| 2010/0313271 | A1 | * | 12/2010 | Johnson et al. | 726/24 |
| 2011/0078796 | A1 | * | 3/2011 | Khilnani et al. | 726/24 |
| 2011/0099636 | A1 | * | 4/2011 | Tsai et al. | 726/24 |
| 2011/0107425 | A1 | * | 5/2011 | Lee et al. | 726/24 |
| 2011/0219453 | A1 | * | 9/2011 | Turbin | 726/24 |
| 2011/0289325 | A1 | | 11/2011 | Chen | |
| 2013/0291112 | A1 | * | 10/2013 | Shue et al. | 726/24 |

* cited by examiner

*Primary Examiner* — Samson Lemma
(74) *Attorney, Agent, or Firm* — Dorsey & Whitney LLP

(57) ABSTRACT

A removable media device, which may be a USB attached device or other type of removable media device, includes a software program located on the device which upon startup or access, the software program scans one or more of electronic files stored on the removable media device and electronic files being transferred to or from the electronic media device and to or from a host computing system for the detection of viruses therein. The software program is further configured to block the transfer of detected virus-containing electronic files and to disallow the copy or writing of files to or from the removable media device to or from a host computing system that can not be scanned. The software program is further configured to block the encryption of files being written to a removable media device if such device contains hardware or software encryption if such files can not be scanned.

17 Claims, 3 Drawing Sheets

ANTIVIRUS SYSTEM AND METHOD FOR REMOVABLE MEDIA DEVICES

CROSS REFERENCE TO RELATED APPLICATIONS

This application is a divisional of U.S. patent application Ser. No. 13/269,463, entitled ANTIVIRUS SYSTEM AND METHOD FOR REMOVABLE MEDIA DEVICES, filed Oct. 7, 2011 and issuing Jan. 21, 2014 as U.S. Pat. No. 8,635,698, the contents of which are hereby incorporated by reference, in their entirety and for all purposes.

TECHNICAL FIELD OF THE DISCLOSURE

The present disclosure relates to an antivirus system and method. More particularly, the present disclosure relates to employing antivirus protection directly on PC computer removable media storage devices. Such devices may also include hardware or software encryption which normally interferes with antivirus protection. The disclosure presents a method to ensure that viruses and malware are not encrypted first, thus escaping detection from antivirus protection systems and methods.

BACKGROUND

Computer viruses are software programs whose basic operation is that of auto-installing on a computer system and auto-propagating to other systems via network connections or transferable data storage media. Apart from these basic actions, a virus can cause other damages, such as data erasing, "spamming," allowing access into the host computer system by unauthorized users, overloading of certain Internet sites, etc.

In response to and for protection against computer viruses, computer programs generally referred to as "antivirus" programs have been created to prevent a host computer system from being infected, i.e., to prevent the virus from being installed on the system, or to eliminate the virus if found already installed. These programs analyze data present on the host computer system to be protected (or inputted therein/outputted therefrom) and compare them to a database on which there is stored information on known viruses to enable their identifying inside files. When a virus is identified, the files containing it are blocked or diverted/rerouted or quarantined, or otherwise brought to the user's attention.

As used herein, a "computer program" or "software" may generally refer to one or more computer executable instructions, routines, algorithms, modules, or programs, including separate applications or code from dynamically linked libraries for performing functions and actions as described herein. Software may also be implemented in various forms such as a stand-alone program, a servlet, an applet, instructions stored in a memory, part of an operating system, or other type of executable instructions. One of ordinary skill in the art will appreciate that the form of software is dependent on, for example, requirements of a desired application, the environment the software runs on, and/or the desires of a designer/programmer or the like. Software is also referred to as "code." Further, as used herein, "module" or "software module" may generally refer to a portion of software such as a driver or kernel subsystem of a given type, or more generally any logically independent software component type.

As used herein, the term "antivirus" may generally refer to any scanning technology that can detect and mitigate threats against a computer system, particularly those threats that include viruses, worms, Trojans, spyware, and any other malware.

In computer storage, removable media refers to any storage media which is designed to be removed from the computer without powering the computer off. Some types of removable media are designed to be read by removable readers and drives. Examples of removable media include: optical discs (Blu-ray discs, DVDs, CDs), memory cards (CompactFlash card, secure digital card, memory stick), floppy disks/zip disks, RDX cartridges, magnetic tapes, among others. Some removable media readers and drives are integrated into computers, with the media itself being removable from the drive that is integrated into the computer.

A particular type of removable media includes removable storage devices, which are used to transport or store data. Examples of removable storage devices include universal serial bus (USB) flash drives and external hard disk drives, among others. As used herein, the term "USB" may generally refer to devices, processes, or media compliant with the USB 1.0, USB 2.0, USB 3.0, and/or other USB and/or "USB OTG" standards.

A common way for the introduction of computer viruses into a computer system is through the use of removable media devices. Lacking in the art are systems and methods for effective prevention of computer virus transmission through the sharing of removable media between host computing systems, and ensuring files infected with viruses are not encrypted through native software or hardware based encryption features available on these removable storage drives, thus providing a method to bypass normal antivirus detection methods.

BRIEF SUMMARY OF THE DISCLOSURE

In one embodiment, disclosed herein is a system for providing antivirus protection in a removable media device, which may include a removable media device, wherein the removable media device may include an executable software program stored thereon and a connection portion for electronic connection with a host computing system, wherein the host computing system may include a removable device receiving portion for receiving the connection portion in an operative electronic connection and a data storage device having stored thereon an antivirus program, and wherein the software program stored on the removable media device may include a communication module for communicating an electronic instruction to the antivirus program stored on the host computing system directing the antivirus program to scan electronic files stored on, or being transmitted to or from, the removable media device.

In variations of this embodiment, the removable media device may be a removable storage device for transporting and storing electronic data. More particularly, the removable storage device may be a USB attached storage device, including but not limited to a flash drive or a thumb drive or removable hard drive.

In further variations of this embodiment, the communication module may be configured to automatically communicate with the antivirus program of the host computing system without intervention from a user of the host computing system. The software program stored on the removable media device may further include an updating module configured to determine the currency of validation files associated with the antivirus program. The updating module may be configured to establish an electronic connection, via a network, with a website of the antivirus program for downloading current validation files for the antivirus program. Further, the updating module may be configured to download current validation files in response to a determination that the validation files associated with the antivirus program are not current. And in a further variation, the updating of the module can be performed from the antivirus program on the host computing system itself, without intervention from a user of the host computing system.

In still further variations of this embodiment, the software program stored on the removable media device may further include a virus scan blocking prevention module configured to detect an attempt to block the scanning of one or more of the electronic files. The virus scan blocking prevention module may be configured to detect an attempt by a virus to block the scanning of an electronic file. Additionally or alternatively, the virus scan blocking prevention module may be configured to detect an attempt by a user of the host computing system to block the scanning of an electronic file. Further, upon detection of an attempt to block the scanning of an electronic file, the virus scan blocking prevention module may prevent data transfer to or from the removable device.

In an additional aspect of this embodiment, the software program stored on the removable media device may be configured to copy one or more electronic files onto the host computing system. The one or more electronic files may be copied into a TEMP directory of the host computing system, the purpose of which may include one or more of: a) ensuring the continuous operation of the antivirus scanning solution in the event that the removable device is physically ejected during the update of antivirus program files stored on the removable device, b) allowing for a Monitoring Program to be installed in the TEMP directory that ensures the continuous and efficient scanning of files being written from the host computer system to the removable storage device even in the event a user or program attempts to circumvent or remove the antivirus scanning program, and/or c) providing a safe location wherein antivirus signature validation files can be updated for use with the removable media, irrespective of whether or not the removable media device is inserted into the host computing system or not. Antivirus signature validation files that have completed updating in the TEMP directory of the removable media may be restored when the device is next re-inserted into the host, ensuring that the antivirus program files, now fully up to date, are restored on to the removable media for use on other host computers.

In a further embodiment the Monitoring Program stored in the TEMP directory of the host computer may be loaded into computer memory, and may determine if any user or system operations are detected that block antivirus program operations, or user operations to kill, cancel or delete the antivirus program software running on the removable device. When such operations are detected, the Monitoring Program running from the TEMP directory of the computer system can automatically restore antivirus program functionality to the removable device, using the copied antivirus program files stored in the TEMP directory, and until such files are restored will attempt to block further operations to the drive by using programmatic commands issued through the operating system to block the drive from further user activity.

In another embodiment, disclosed herein is a method for providing antivirus protection in a removable media device, which may include sending an electronic instruction from a removable media device to a copy of the antivirus program files stored in the TEMP directory of the host computing system in operative association with the removable media device to scan one or more electronic files to be transferred to or from the removable media device to the host computing device; and, in response to an indication from the antivirus program that a virus has been detected in an electronic file, blocking or deleting the virus-detected file from the removable media device.

In another embodiment, the removable media device, executing from the antivirus software from the device itself, may utilize the device to provide antivirus scanning services for the host computing system, thereby providing scanning and detection of virus or malware infected files stored natively on the host computing system.

In variations of this embodiment, the method may further include providing a removable media device having stored thereon a software program configured to electronically execute the said sending and blocking or deleting of files. The method may also include checking the currency of validation files associated with the antivirus program. The method may further include initiating a download, via electronic network connection, of current validation files where the validation files associated with the antivirus program are not current. Still further, the method may include preventing file transfer from the removable media device where an attempt to block antivirus program scanning of the electronic files is detected.

In yet another embodiment, disclosed herein is a removable media device that may include a software program configured to communicate with an antivirus program of a host computing system with which the removable media device is associated, wherein, upon receiving a communication from the software program, the antivirus program may scan one or more electronic files stored on the removable media device and electronic files being transferred to or from the electronic media device for the detection of viruses therein. In an additional aspect of this embodiment, the software program may be further configured to block the transfer of detected virus-containing electronic files. The removable media device may be a USB device, including but not limited to a thumb drive or flash drive or removable hard drive.

In another embodiment, the presently described techniques may ensure that files that contain viruses and malware are not encrypted on a removable device, if such device includes software or hardware encryption. In this embodiment, any files being written from the host computing system to the drive may be pre-processed through the antivirus program running from the removable media before they are allowed to be processed through a software encryption program running from the device, or in the event the removable device uses hardware encryption, any files containing a virus may be deleted post encryption.

In yet another embodiment, the antivirus program running from the TEMP directory of the host computing system, in conjunction with the antivirus program running from the removable device itself can simultaneously detect and block any new files written to the removable device from the host computing system, and any existing files that may already exist on the device from other user operations prior to the antivirus program feature being installed on the removable media itself.

In variations of this embodiment, if the files to be scanned before they are written from the host computing system to the removable device cannot be scanned, because they are either not recognizable, or the files themselves have been encrypted or password protected using a separate program, these files are blocked and are not written and or not allowed to be encrypted on the drive because they are not scannable files. This may ensure that files that cannot be scanned cannot be written to the removable drive which could constitute a threat to other host computing systems.

In a further variation of this embodiment, if the file being written to the drive cannot be scanned, rather than block the file, an alert message may be displayed to the user indicating that the file cannot be scanned but allowing for the user to make a decision whether or not they want to write the file to the drive without scanning. If the user positively affirms that they desire to write the file to the drive without scanning, the file may be allowed to bypass antivirus scanning.

In yet a further variation of this embodiment, a policy setting in the software can be set using Administrator installer commands providing the determination of whether or not the user can bypass the antivirus scanning of files that cannot be scanned.

While multiple embodiments are disclosed, still other embodiments will become apparent to those skilled in the art from the following detailed description. As will be apparent, the system and method is capable of modifications in various obvious aspects, all without departing from the spirit and scope of the teachings herein. Accordingly, the detailed description is to be regarded as illustrative in nature and not restrictive.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
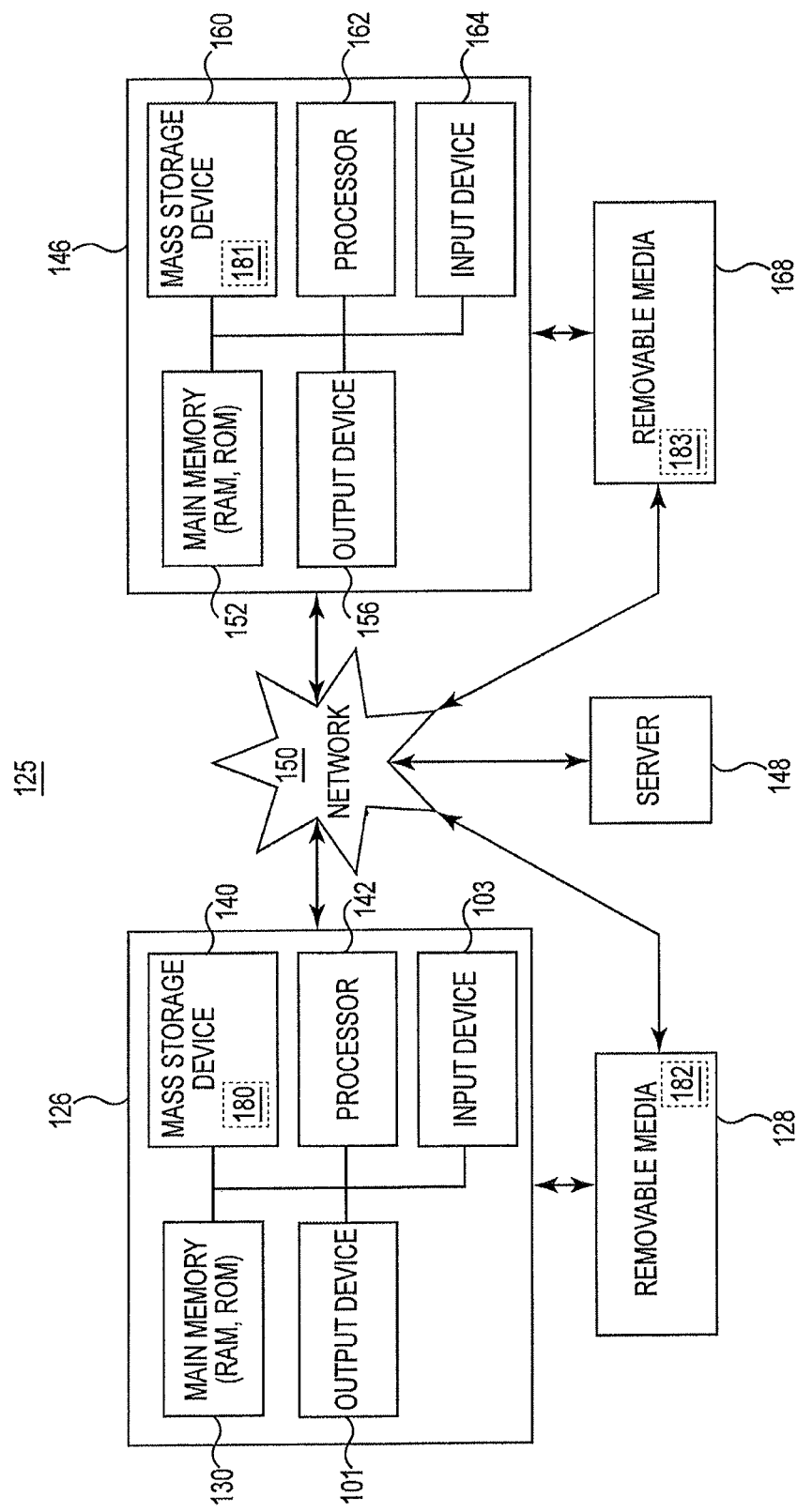
FIG. 1 depicts a computer-implemented system suitable for use with embodiments of the present disclosure.

Embodiments of the present disclosure may be implemented through one or more computing devices and/or removable media connected with one another through an electronic connection interface and/or an electronic network. As shown particularly in FIG. 1, an example system 125 in accordance with the present disclosure may include one or more computing devices 126 connected with a network 150, such as a local area network (LAN) or the Internet. Computing device 126 can interact with a server 146 in order to input and receive electronic information. Computing devices as used herein are not limited to traditional personal computers, but may also include laptops, PDAs, Smartphones, tablet computers, and the like.

System 125 may also include the ability to access one or more website servers 148 in order to obtain content from the Internet. While only one computing device is shown for illustrative purposes, system 125 may include a plurality of computing devices 126 and may be scalable to add or remove computing devices to or from a network.

Computing device 126 illustrates components of an embodiment of a suitable computing device for use with the present disclosure. Computing device 126 may include a main memory 130, one or more mass storage devices 140, a processor 142, one or more input devices 103, and one or more output devices 101. Main memory 130 may include random access memory (RAM), read-only memory (ROM), or similar types of memory. One or more programs or software 180 may be stored in one or more data storage devices 140. Programs or software 180 may include one or more antivirus programs. Data storage devices 140 may further include a database for storing electronic data. Programs or software 180 may be loaded in part or in whole into main memory 130 or processor 142 during execution by processor 142. Mass storage device 140 may include, but is not limited to, a hard disk drive, floppy disk drive, CD-ROM drive, smart drive, flash drive, or other types of non-volatile data storage, a plurality of storage devices, or any combination of storage devices. Processor 142 may execute applications or programs to run systems or methods of the present disclosure, or portions thereof, stored as executable programs or program code in memory 130 or mass storage device 140, or received from the Internet or other network 150. Input interface 103 may include any device for entering information into computing device 126, such as but not limited to a microphone, digital camera, video recorder or camcorder, keys, keyboard, mouse, cursor-control device, touch-tone telephone or touch-screen, a plurality of input devices, or any combination of input devices. Output device 101 may include any type of device for presenting information to a user, including but not limited to a computer monitor or flat-screen display, a printer, and speakers or any device for providing information in audio form, such as a telephone, a plurality of output devices, or any combination of output devices.

A server 146, for example located remotely from the computing device 126, may also be connected to the network 150. Server 146 may include a main memory 152, one or more mass storage devices 160, a processor 162, one or more input devices 164, and one or more output devices 156. Main memory 152 may include random access memory (RAM), read-only memory (ROM), or similar or other types of memory. One or more programs or software 181 may be stored in one or more mass storage devices 160. Programs or software 181 may be loaded in part or in whole into main memory 152 or processor 162 during execution by processor 162. Programs or software 180 may include one or more antivirus programs. Mass storage device 160 may include, but is not limited to, a hard disk drive, floppy disk drive, CD-ROM drive, smart drive, flash memory or drive or other types of non-volatile data storage, a plurality of storage devices, or any combination of storage devices. Processor 162 may execute applications or programs to run systems or methods of the present disclosure, or portions thereof, stored as executable programs or program code in memory 152 or mass storage device 160, or received from the Internet or other network 150. Input device 164 may include any device for entering information into server 146, such as but not limited to, a microphone, digital camera, video recorder or camcorder, keys, keyboard, mouse, cursor-control device, touchtone telephone or touch-screen, a plurality of input devices, or any combination of input devices. Output device 156 may include any type of device for presenting information to a user, including but not limited to, a computer monitor or flat-screen display, a printer, or speakers or any device for providing information in audio form, such as a telephone, a plurality of output devices, or any combination of output devices. Server 146 may store a database structure in mass storage device 160. Any type of data structure can be used, such as a relational database or an object-oriented database.

Removable media devices 128, 168 may be operably associated with the computing device 126 or the server 146, respectively, and/or with the network 150. Removable media devices 128, 168 may be provided for the transfer of data to or from the computing device 126 or the server 146. One or more programs or software 182, 183 may be stored on the removable media devices 128, 168. Programs or software 182, 183 may be configured to access and communicate with the programs or software 180, 181 of the computing device 126 and the server 146, respectively, as will be described in greater detail below.

Embodiments of the present disclosure may be implemented through one or more removable media devices, for example the removable media devices 128, 168 as described above. In one embodiment, the removable media device is a removable storage device, although other types of removable media devices may be used. In one embodiment, the removable storage device is a USB device, although other types of removable storage devices may be used.

Figure 2:
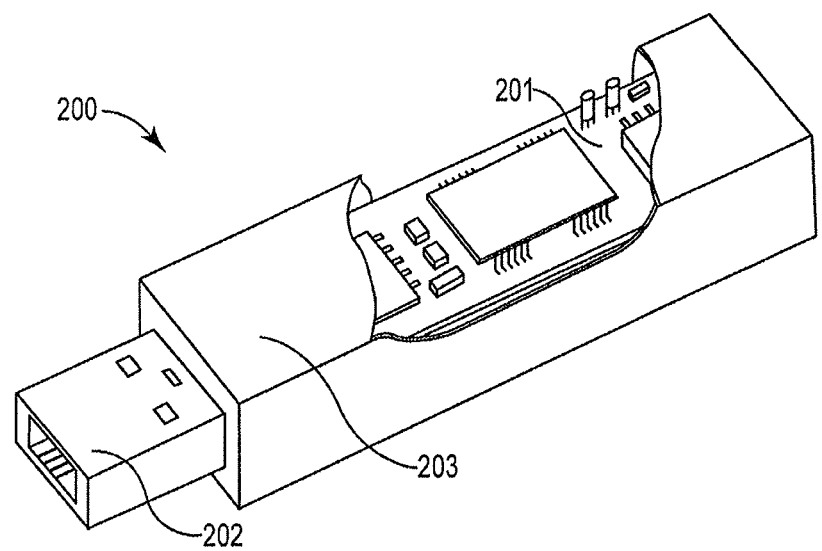
FIG. 2 depicts a hardware section diagram of a removable media device suitable for use with embodiments of the present disclosure.

FIG. 2 depicts an example removable media device embodied as a USB device 200 in accordance with the present disclosure. A USB storage device 200 may include a memory portion 201 coupled to a USB connector 202 capable of mating within a USB slot of a host device, for example the computing device 126 or the server 146. The memory portion 201 may be housed within a casing 203. The memory portion 201 may include a printed circuit board on which may be mounted one or more flash memory chips, a controller, passive components and/or an LED for indicating when the memory is being accessed.

While there are several types of USB connectors, the most commonly used is the type-A plug on which is a 4-pin connector, surrounded by a shield. A conventional type-A USB plug may include a base on which is formed a signal power pin, a pair of signal pins, and a signal ground pin. During a conventional fabrication process, the USB connector may be affixed to the memory portion, as by welding and/or soldering, and the memory portion and connector may then be covered by the shield. Other types of USB devices, and USB devices created using other fabrication methods, are also suitable for use with the presently described system and method.

USB devices, as data storage devices, may be capable of storing and transmitting data. When operably connected with a computing system, such as computing system 126 or server 146, USB devices may be capable of transmitting data thereto or receiving data therefrom. Where a computer virus has been stored on a USB device, either independently or as part of another electronic file on the device, the USB device may have the capability of transmitting the virus to the computing system, thereby infecting the computing system with the virus. As such, it is desirable to employ antivirus protection against the transmission of viruses from removable media such as USB devices.

In one embodiment, disclosed is a software product that can be added to any type of removable storage media, for example, a USB drive, to provide antivirus protection against viruses that may be stored on such removable storage media. The software product may be provided in any computer language, for example C++, and may run as a background process to enforce antivirus scanning of the removable media device. Referring again to FIG. 1, the presently described software product may be implemented as software 182, 183 on the removable media devices 128, 168, respectively. The software product may interact with software 180, 181 on the computing device 126 or server 146, respectively. Such software 180, 181 may be in whole or in part an antivirus program capable of scanning files on the removable media device 128, 168.

In one example, the antivirus program may include the McAfee Antivirus Olympus Scan Engine™, including the McAfee Olympus Scan 5300™ and/or the McAfee Olympus Scan 5400™. Other commercial antivirus programs from other vendors are also suitable for use with the present disclosure and the current embodiment is not reliant on any unique features of any commercial antivirus program, including the McAfee Antivirus Olympus Scan Engine™.

The antivirus software program for removable drives and media that has been uniquely developed under this invention disclosure itself, separate and distinct from commercial antivirus programs, may provide the unique capability to invoke, launch and use commercial scanning programs in conjunction with removable storage devices, may run these operations from the device itself, and may provide all of the logic to monitor the scanning of the device, copy and launch the program from the TEMP environment of the host computer, remove the device from the operating system if the antivirus signature validation files are out of date, provide for the blocking of non-scannable files and provide for the quarantine and pre-processing of files before they are encrypted on a removable device that has either hardware or software encryption contained therein.

In one embodiment, the software product of the present disclosure, implemented on a removable media device, may include an antivirus software communication module. The antivirus software communication module may be configured to allow the software product to electronically communicate with the antivirus program of the host computing device. Such communication may include, for example, sending electronic instructions, receiving electronic instructions, sending data, receiving data, and/or other data transfer protocols. One example electronic instruction may include an instruction to scan files stored on the removable media devices for viruses. In another example, an electronic instruction may include an instruction to scan files being written to the removable media for viruses. In a further example, all files written to or from the removable device, and/or stored on the device may be scanned for viruses.

In one embodiment, the software product of the present disclosure, implemented on a removable media device, may include an antivirus software program. The antivirus software program allows the device to scan files on the drive, files being transferred to the drive, and files being transferred from the drive, to ensure the absence of malware. The device further may contain a communication module that may be configured to allow the device to electronically communicate with the antivirus program of the host computing device to obtain updates to the virus protection software. The communication module also may allow the device to communicate with a network, including the Internet, to obtain updates.

Such scanning may or may not result in the detection of a virus. Where a virus is detected, the antivirus program may block the virus from being transferred and/or delete the file from storage. In one example, the antivirus program may accomplish this blocking automatically without communication from the software product on the removable media device. In another example, the communication module may send an instruction to perform such blocking in response to receiving a communication from the antivirus program that a virus has been detected. Additionally or alternatively, the user may be notified of the presence of the virus, for example through output device 101, 156 (FIG. 1).

In one embodiment, the software product of the present disclosure may employ a multiple-thread data transfer model to ensure that multiple simultaneous write or read operations to/from the removable media device cannot delay the detection of or prevent the copying of a virus-detected file. Multiple thread data transfer may refer to the simultaneous transfer of more than one file. As such, the software product and the antivirus software may be configured to scan more than one thread of data simultaneously or scan more than one stored file simultaneously to prevent viruses from being transferred/stored. In alternative embodiments, a single thread model may be used.

In one embodiment, the software product of the present disclosure may include a virus scan blocking prevention module. Some viruses may include computer code that may be designed to block or otherwise thwart the scanning of such virus, or of a file wherein such virus is contained, in order to prevent the detection of such virus. Further, scan blocking may originate from a virus already stored on the host computing system, or from a user of the host computing system. As such, it may be desirable to employ scan blocking prevention as part of the presently disclosed system and method.

In one example, the virus scan blocking module employs a separate background monitoring process to ensure that, if an attempt is made to block the scanning process, the virus scan blocking prevention module may block the removable media device from being accessed, thereby preventing the transfer of any viruses to or from the device. Where the virus scan blocking module is activated to prevent any data transfer, the user of the host computer may be notified of such action, allowing the user to take corrective measures, if desired.

In one embodiment, the presently described software product may include an antivirus updating module. The antivirus updating module may ensure that the antivirus software of the host computing system is updated on a regular basis, for example, daily, weekly, monthly, etc., by checking for the presence of current antivirus validation files. Where updating has not occurred, the antivirus updating module may either initiate such an update on the host computing system (for example, through a network connection with the antivirus software provider) and/or block any data transfer to or from the removable media device. Where the antivirus updating module is activated to prevent any data transfer or to update the antivirus software, the user of the host computer may be notified of such action, allowing the user to take corrective measures, if desired.

In one example, the antivirus updating module may automatically and in the background operate in the following manner. First, the module may look for the presence of the antivirus program installed on the host computer. If such a product is installed, the module may use the "signature files" (i.e., software validating files) from that antivirus program if they are updated. Second, the module may attempt to update the virus validation files from a secure website of the antivirus software provider, or from the software on a connected host computer, if available. Third, if neither of the first two programmatic methods work, the user may be displayed a notification that informs such user to take corrective action, which may include manually updating the antivirus software or indicating where the validating files may be found on the host computing system, for example.

In a further aspect, the antivirus updating module may enforce the license of the antivirus program subscription. Users may be notified within a given time frame, for example, 30 days in advance, that their antivirus subscription is expiring, and they may be directed to the software provider to update their subscription. Where the subscription has expired, the module may block data transfer to or from the removable media device, or the antivirus module may cease to operate, with or without some form of notifications to the user. Upon update, the user may access the device again.

In one embodiment, in addition to running from the removable media device, for example a USB device, the presently described software product may copy one or more files to the host computer's "TEMP" (temporary) environment, for example a "TEMP file" on the hard drive or other mass storage device (e.g., mass storage device 140, 160) thereof. The one or more files copied may relate to, for example, DAT file updating and/or antivirus monitoring. Using the TEMP environment of the host computing system may improve the speed of operation of the presently described system and method.

The use of the TEMP environment may also improve the performance of the presently described system and method where one or more of such copied files are lost. For example, if the current DAT files stored on the removable media device or on the host computing system are eliminated or formatted away, the software product may use whichever DAT files are the most current, either those stored on the removable drive or those stored in the TEMP environment, to update the corresponding files.

The use of the TEMP environment may also improve the security and integrity of the presently described system and method. For example, if it is detected that a user has attempted to halt or stop the antivirus scanning functionality, a separate virus scan blocking prevention module that may be copied to the user's TEMP environment on the mass storage device may block access to the removable media device from the host computing system itself.

In one embodiment, no administrative rights on the host computing system are required to run the presently described software product. For example, even a restricted user's removable media device may be fully protected. In alternative embodiments, the software product may only run where the user has a designated level of access to the host computing system, for example, non-restricted, administrative, etc.

Variations may be made to any of the embodiments described herein. For example, the software product may be configured for use in a multi-drive partition model, where more than one drive is present on a removable media device. In another example, the software product may be configured for integration with third party or other password access programs that control access to hardware-encrypted drives, or encryption with third party or other encryption programs. In yet another example, the software product may be deployed as an installed image at the root level of a drive or in an enclosed CD ROM partition on a drive in a two partition drive implementation.

Further variations of the presently described embodiments may include the use thereof in connection with one or more data encryption systems. In one example, U.S. patent application Ser. No. 10/718,417 discloses a systems and methods for secure transaction management and electronic rights protection. In another example, U.S. patent application Ser. No. 10/930,173 discloses systems and methods for the automatic detection of sensitive digital information. The contents of these applications are incorporated herein by reference in their entirety.

Figure 3:
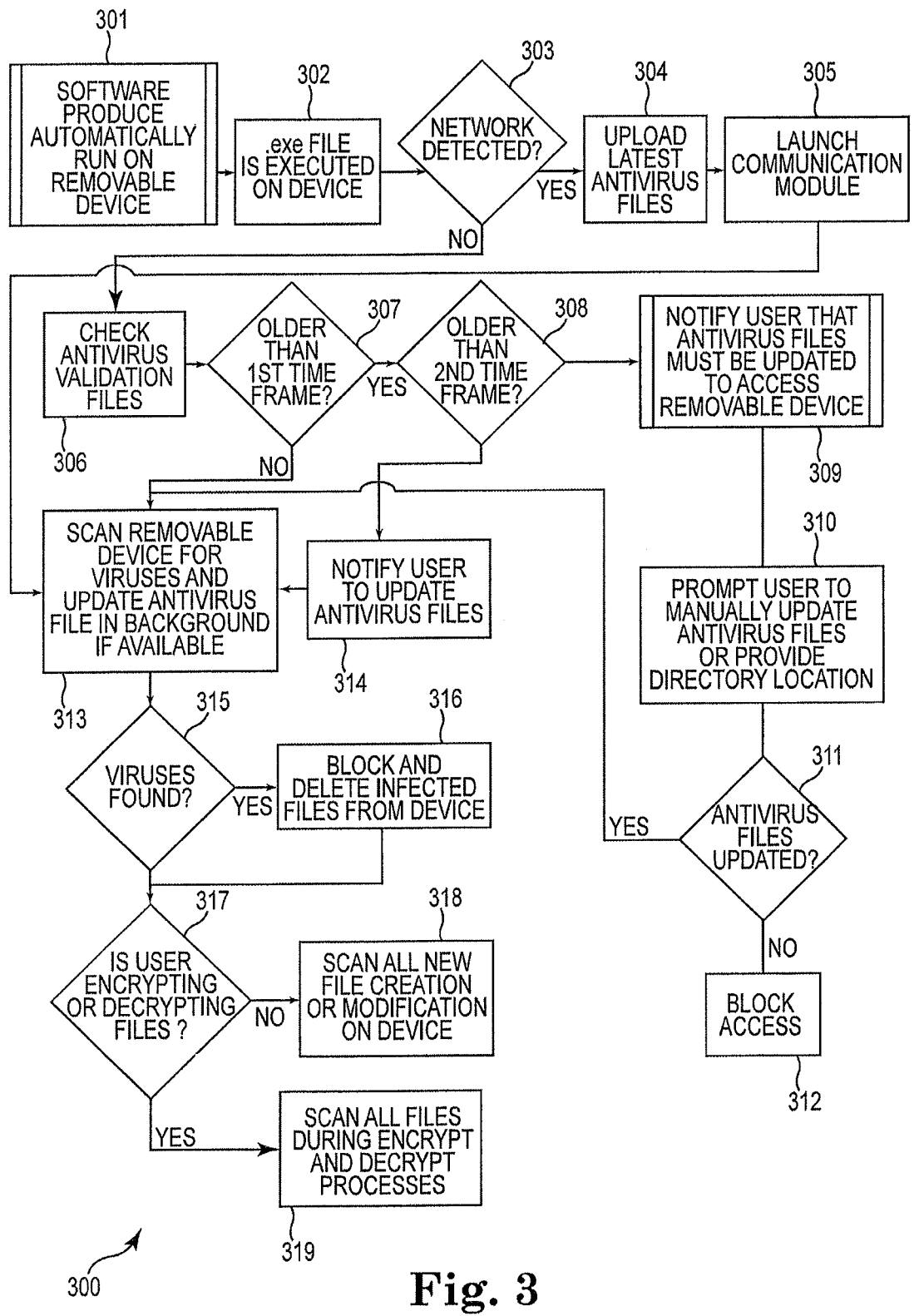
FIG. 3 depicts a block diagram of one embodiment of a method in accordance with the present disclosure.

FIG. 3 provides a block diagram of one embodiment of a method 300 in accordance with the present disclosure. At block 301, the software product may automatically run on the removable media device upon operable connection with a host computing system. This may include the execution of an executable (.exe) file, for example, as shown at block 302. In one embodiment, at decision block 303, the software product may search for a network connection, for example, through the host computing system (see FIG. 1, network 150). Where a network connection is detected, at block 304, the software product may cause the latest antivirus validation files to be uploaded to the host computing system, and the communication module may be launched (block 305) for operable connection with the antivirus software of the host computing system.

Where a network connection is not detected, at block 306, the antivirus validation files then existing on the host computing system may be checked to determine their currency. It may be determined (decision block 307) whether the validation files are older than a first time frame, for example, 20 days. If the validation files are older than the first time frame, it may be subsequently determined (decision block 308) whether the validation files are older than a second time frame, for example, 30 days.

Where the validation files are older than the first time frame but not older than the second time frame, the user may be notified, at block 314, to update the antivirus files within a specified amount of time (e.g., before the end of the second time frame). Where the validation files are older than the second time frame, the user may be notified, at block 309, that the antivirus validation files must be updated to access the removable media device.

Where access to the removable media device is denied due to the lack of currency of the validation files, the user, at block 310, may be prompted to manually update the validation files or to provide a directory location where the current validation files can be found. Thereafter, at decision block 311, it may be determined if the user has updated the validation files. If not, access to the removable media device may remain blocked, as indicated at block 312.

Where the latest antivirus files have been uploaded (block 304), where the antivirus validation files are not older than the first time frame (block 307), where the user has been provided with a notification to update the antivirus files (block 314), or where the user has manually updated the antivirus validation files (block 311), the software product may scan the removable device for viruses and update the antivirus validation files, where available, as shown at block 313. It may be determined whether any viruses were found in the scan (decision block 315). Where viruses have been found, the viruses (or files containing viruses) may be blocked and/or deleted from the removable media device, as shown at block 316.

As discussed above, the presently described systems and methods may be employed in connection with one or more data encryption systems and methods. Where the user is encrypting or decrypting files (decision block 317), the files of the removable media device may continue to be scanned for viruses during the encryption and/or decryption processes, as shown at block 319. Where the user is not encrypting or decrypting files, all files that are created or modified on the removable media device may be scanned, as shown at block 318.

While the method 300 has been described with respect to specific procedures and functions, performed in a specific order, it will be appreciated that one or more procedures may be omitted, one or more procedures may be added, and/or one or more of the procedures may be performed in a different order consistent with the present disclosure. As such, the particular example method 300 shown in FIG. 3 is not intended to be limiting.

Various benefits and advantages may be realized by the systems and methods of the present disclosure. For example, viruses may be effectively protected against transmission onto a host computing system by means of a removable media device. In this regard, the described software product may operate automatically without the need for any initiation by the user of the host computing system. Further, where antivirus scanning is attempted to be prevented or blocked, the software product may block access to the removable media device, thereby preventing any circumvention of the scanning procedures described herein. The software product may benefit from being contained on the removable media device itself, communicating with the antivirus software of the host computer, thereby ensuring that the virus protection provided is independent of the host computer with which the removable media device is associated. However, the speed of the processes described herein may be improved where the software product is able to access and store information in the TEMP environment of the host computing system.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and systems within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method for providing antivirus protection in a removable media device, the method comprising:
sending an electronic instruction from the removable media device to an antivirus program of a host computing device in operative association with the removable media device to scan one or more electronic files to be transferred from the removable media device to the host computing device;
in response to an indication from the antivirus program that a virus has been detected in one or more of the electronic files, blocking or deleting such virus-detected electronic files to be transferred from the removable media device to the host computing device; and
preventing one or more of the electronic files from being transferred from the removable media device, wherein an attempt to block the antivirus program from scanning of the one or more electronic files is detected.

2. The method of claim 1, further comprising storing on the removable media device a software program configured to electronically execute said sending and blocking or deleting.

3. The method of claim 1, further comprising checking currency of validation files associated with the antivirus program.

4. The method of claim 3, further comprising initiating a download, via electronic network connection, of current validation files, wherein the validation files associated with the antivirus program are not current.

5. A removable media device comprising a software program stored on a non-transitory computer-readable medium, the software program configured for execution on a computer processor to:
   communicate with an antivirus program of a host computing system with which the removable media device is associated; and
   upon receiving a communication from the software program, the antivirus program scanning one or more of electronic files stored on the removable media device and electronic files being transferred to or from the removable media device for detection of viruses therein;
   wherein the removable media device employs encryption, and wherein the antivirus program is configured to scan one or more of the electronic files for viruses pre-encryption and to not allow one or more other of the electronic files to be encrypted, wherein the one or more other electronic files cannot be scanned by the antivirus program.

6. The removable media device of claim 5, wherein the software program is further configured for execution on the computer processor to block transfer of detected virus-containing electronic files to or from the electronic media device.

7. The removable media device of claim 5, wherein the removable media device comprises a USB device attached to the host computing system.

8. The removable media device of claim 5, wherein the software program comprises a communication module configured for execution on the computer processor to automatically communicate with the antivirus program of the host computing system without intervention of a user of the host computing system.

9. The removable media device of claim 5, wherein the software program comprises an updating module configured for execution on the computer processor to:
   determine currency of validation files associated with the antivirus program;
   establish an electronic connection, via a network, for downloading current validation files for the antivirus program; and
   download the current antivirus validation files in response to a determination that the validation files associated with the antivirus program are not current.

10. The removable media device of claim 5, wherein the software program comprises a virus scan blocking prevention module configured for execution on the computer processor to:
   detect an attempt by a virus to block scanning of one or more of the electronic files; and
   detect an attempt to block scanning of one or more of the electronic files by attempting to write a previously encrypted file that contains a virus to the removable media device.

11. The removable media device of claim 10, wherein upon detection of such an attempt to block scanning of one or more of the electronic files, the virus scan blocking prevention module prevents data transfer to or from the removable media device.

12. The removable media device of claim 5, wherein the software program is configured for execution on the computer processor to copy one or more of the electronic files to a TEMP environment of the host computing system.

13. A method for providing antivirus protection in a removable media device the method comprising:
   sending an electronic instruction from the removable media device to an antivirus program of a host computing device in operative association with the removable media device to scan one or more electronic files to be transferred from the removable media device to the host computing device;
   in response to an indication from the antivirus program that a virus has been detected in one or more of the electronic files, blocking or deleting such virus-detected electronic files to be transferred from the removable media device to the host computing device; and
   copying the one or more electronic files to a TEMP environment of the host computing system;
   wherein one or more of the electronic files copied to the TEMP environment of the host computing system comprises a monitor program executable on a computer processor to detect user or program operations intended to defeat, kill, or erase an antivirus program running from the removable media device.

14. The method of claim 13, wherein upon detection of such user or program operations the antivirus program running from the removable media device is restored to the removable media device, and, until the program is restored, user operations to and from the removable media device are interrupted through issuance of one or more operating system commands to remove the removable media device from the host computing device.

15. The method of claim 1, wherein the removable media device employs encryption, and wherein the antivirus program scans one or more of the electronic files for viruses pre-encryption and does not allow one or more other of the electronic files to be encrypted, wherein such other electronic files cannot be scanned.

16. The method of claim 1, further comprising scanning one or more of the electronic files during a decrypt operation prior to writing such electronic files to the host computing system.

17. The method of claim 1, further comprising blocking one or more of the electronic files from being decrypted to the host computing system, wherein the one or more such electronic files cannot be scanned by the antivirus program.

* * * * *